United States Patent Office 3,681,125
Patented Aug. 1, 1972

3,681,125
PROCESS FOR THE PRODUCTION OF MICRO-POROUS SHEET STRUCTURES
Harro Träubel, Leverkusen-Kueppersteg, and Klaus König, Leverkusen, Germany, assignors to Farbenfabriken Bayer Aktiengesellschaft, Leverkusen, Germany
No Drawing. Filed Nov. 29, 1968, Ser. No. 780,264
Claims priority, application Germany, Dec. 7, 1967, F 54,242
Int. Cl. B32b 3/00; C08j 1/14
U.S. Cl. 117—135.5                               5 Claims

ABSTRACT OF THE DISCLOSURE

Microporous sheet structures are prepared by reacting a compound having a molecular weight of from about 500 to about 10,000 and at least two terminal OH groups (1), an organic polyisocyanate (2) having at least two NCO groups and a molecular weight of from about 100 to about 10,000 and water (3) in amounts such that the NCO:OH or NCO to NH is from 0.8/1 to 2/1, the product of the reaction having a Shore A hardness of at least 50, a tensile strength of at least 50 kg. wt./cm.$^2$ and a softening point above 100° C. the reaction occurring in a solvent thus dissolves the compounds (1) and (2) and dissolves the polyurethane urea formed with increasing difficulty as polyaddition increases and causes gelling after 20 minutes at the most, does not cause substantial swelling of the completely reacted polymer and is substantially removed after solidification and pouring the reaction mixture into a support.

This invention relates to microporous sheet structures and to a process of preparing the same. More particularly it relates to polyurethaneurea microporous sheet structure.

The production of microporous sheet structures from solutions of polyurethanes in mixtures of solvents and nonsolvents of certaain compositions and properties is already known. This process yields sheet structures which have good physical properties. The polyurethanes are, however, only soluble in solvents which are highly polar and these are mostly toxic, expensive and difficult to work up. Further, it is not usually possible to prepare highly concentrated solutions of these polyurethanes, which is a disadvantage in commercial processes.

The use of water as chain lengthening agent for the polyisocyanate polyaddition reaction is already known (see Angewandte Chemie, 64 (1962), 524). However, polyurethane, polyureas which have been prepared with water can only be dissolved in highly polar solvents, such as dimethylformamide and dimethylacetamide. These solutions can be worked up into microporous sheet structures only with difficulty by coagulation with water using a complicated and lengthy procedure (DAS 1, 110, 607).

It is therefore an object of this invention to provide improved microporous sheet structures. It is another object to provide an improved method of making microporous sheet structures. It is still a further object to provide polyurethane-urea microporous films.

The foregoing objects and others will become apparent from the following description are accomplished in accordance with the invention, generally speaking, by providing microporous sheet structures by polyaddition in solution of
(1) A compound having at least two terminal OH groups and a molecular weight between about 500 and about 10,000,
(2) A compound having a molecular weight of about 100 to about 10,000 and at least two NCO groups, and
(3) Water, the NCO:OH or NCO:NH being from 1/0.8 to 1/2; the polyurethane polyurea in non-porous form having a Shore A hardness of at least 50 and a tensile strength of at least 50 kg. wt./cm.$^2$ and a softening point above 100° C.; the reaction being carried out at temperatures up to about 150° C., the solution having a concentration of 10 to 80 vols. percent, the solvent being one that (a) dissolves at least starting materials 1 and 2 at the working up temperature,
(b) dissolves the polyurethane polyurea which is to be formed with increasing difficulty as the degree of polyaddition progresses and finally allows it to gel after not more than 20 minutes under the chosen reaction conditions,
(c) does not cause substantial swelling of the reacted polyurethane polyurea and
(d) is substantially removed during solidification of the polyurethane, applying the reaction mixture with shaping while still pourable onto a support, completing the polyaddition at a temperature below the softening point of the polyurethane polyurea and simultaneous and/or subsequently removing the solvent.

In addition to the reactants set forth an additional compound containing hydroxyl or NH groups and having a molecular weight of about 60 to about 600, the reactive groups being comparable in reactivity to the groups of compound 1 with respect to NCO groups may be employed. More especially the reactivity of this hydroxyl or NH groups containing compound should be between the limits of 1/5 to 5 times the reactivity of the NCO groups. Further, a catalyst for the reaction may be used.

Starting materials for the process according to the invention are higher molecular weight compounds which have at least two terminal OH groups, as, for example, polyethers, polyesters, polycarbonates, polyacetals, polythioethers, or polysiloxanes. Such products have been described e.g. in J. H. Saunders and K. C. Frisch, "Polyurethanes," I, New York (1962), pp. 32–61 and in the literature cited therein and also in U.S. Pat. 3,351,608.

Small amounts of low molecular weight chain lengthening agents which have at least two OH or NH groups may also be used, e.g. diols or polyols, or polyamines which have been deactivated. Any suitable low molecular weight chain lengthening agent may be used, such as, for example, glycols, such as, butanediol, hexanediol, bis-ethoxylated hydroquinone and dihydroxynaphthalene, xylylene glycol; diamines, such as, hydrazines, carbodihydrazide, terephthalic acid dihydrazide, ethylene diamine, p-phenylene diamine, aminoalkanols such as ethanolamine, diethanolamine, hydrazinoethanol and the like. A detailed description of such compounds is to be found in Houben-Weyl, "Makromolekulare Stoffe II," Stuttgart, 1962, pp. 71–75, 79–84 and 87 and in E Müller et al., "Angewandte Chemie," 64, pp. 523–531 (1952) and in the literature cited therein.

Usually, however, water is used alone as chain lengthening agent.

The usual polyisocyanates (described, e.g., in Annalen, 562, 75–136 (1949)) or higher molecular weight reaction products (the so-called prepolymers) which contain at least two NCO groups per molecule and which have been obtained from the OH-containing compounds mentioned above and excess polyisocyanates are suitable for the process.

Suitable solvents for the process according to the invention are organic compounds which should preferably boil below 250° C. and are liquid under the reaction conditions and which do not react with the starting materials under the reaction conditions. Suitable solvents are, for example, aliphatic hydrocarbons such as pentanes, hexanes and their homologues; cycloalkanes which may be alkylated, such as cyclohexane, methcyclohexane, cyclododecane; petroleum fractions, in particular mixtures of aliphatic hydrocarbons which have boiling points between 80 and 250° C., e.g. ligroin, cleaning petrol, mineral spirit, mepasin, oils of turpentine; mixed aliphatic-aromatic hydrocarbons such as Tetralin; aromatic hydrocarbons such as benzene, toluene, xylene, ethyl benzene, diethylbenzene, mesitylene; chlorinated hydrocarbons such as di-, tri- and tetrachloromethanes, di-, tri- and perchloroethylenes, di-, tri-, tetra-, penta- and hexachloroethanes, 1,2- and 1,3 - dichloropropanes, isobutyl chloride, dichlorohexane, chlorocyclohexane, chlorobenzene, chlorotoluene; ethers such as di-n-propylether, di-i-propylether, di-n-butyl ether, ethylpropylether, anisole, phenetole; esters such as diethyl carbonates, dimethylcarbonates, ethyl acetate, propyl acetate, butyl acetate, amyl acetate, hexyl acetate, methyl glycol acetate, dimethyl oxalate; ketones such as acetone, methyl ethylketone, methyl-i-butyl ketone, methoxyhexanone, mesityl oxide, phorone, cyclohexanone; acid derivatives such as acetonitrile and nitro compounds such as nitromethane and nitrobenzene.

The reaction of the starting materials can be catalyzed with any known isocyanate polyaddition catalysts (see J. H. Saunders and K.C. Frisch, "Polyurethanes," I, New York (1962), p. 212). Volatile tertiary amines are advantageously used since these, as is well known, least impair the resistance to hydrolysis of the end products. In one special embodiment of the process, tertiary amines are used in such a quantity that they are capable of binding the carbon dioxide liberated in the reaction between the isocyanate and water.

The process is preferably carried out as follows: The components which contain OH, and in some cases NH, groups and the water are dissolved in the solvent or solvent mixture, the polyisocyanate, which can also be in the form of a solution, is stirred in, if necessary in several stages, at the desired temperature, i.e. generally at $-40$ to $+250°$ C., preferably at 10 to 150° C., and catalyst is added to the mixture if desired. The heat of reaction of the polyaddition react which then sets in generally increases the temperature of the solution.

After some time cloudiness appears in the solution, which is accompanied by an increase in the viscosity of the solution and in some cases by evolution of carbon dioxide (if no compound which is capable of binding the carbon dioxide is present). The solution is poured out on to porous or nonporous supports; gelling of the solution takes place within 20 minutes. Reaction mixtures which have longer gelling times, which times depend on the reactivity of the starting materials and the catalyst, if present, may also be used but these are of less technical interest. The polyaddition is preferably completed on the support at a temperature above 60° C. and below 250° C., preferably below 150° C., the film solidifies as a result of this reaction, and the solvents are removed by evaporation at the same time and/or afterwards. Lower temperatures may also be employed but the reaction time is then unnecessarily prolonged.

If it is desired to use a solvent in which water (as chain lengthening agent) is not adequately soluble, it is sufficient to incorporate the water by emulsification.

If the microporous sheet structure was produced on non-porous supports, it is then glued to woven or knitted fabrics, fleeces, split leather etc. by means of non-continuous coatings of adhesive. Sheet structures which have been produced directly on a porous support and those which have been glued on can then be finished and worked up by the usual methods employed for artificial leather.

The composition of starting materials must be such that the polyurethane polyurea formed, when it is present as a homogeneous, non-porous structure, has a Shore hardness A of more than 50, preferably 60 to 100, a tensile strength of more than 50 kg. wt./cm.$^2$, preferably above 200 kg. wt./cm.$^2$, and a softening range above 100° C., preferably above 130° C. The Shore hardness A is determined according to DIN 53 505. The softening range can be determined in known manner, e.g. on a Kofler block (see Houben-Weyl (1953), "Analytische Methoden," 789, 792).

Suitable compositions of starting materials can be found in the literature, e.g. in "Angewandte Chemie," 64 (1952), 523–531; German Pat. 872,268; "Angewandte Chemie," 62 (1950), 57–66 and Houben-Weyl, "Makromolekulare Stoffe," part 2, Stuttgart, 1963, p. 83.

Additional compositions of starting materials which are suitable can be found by preparing the polyurethane in bulk by the melt casting process and investigating its properties. If such compositions do not lead to suitable products or if it is not possible to obtain microporous sheet structures with the desired properties from such compositions, it is often advantageous to include small quantities of trifunctional compounds such as triols, triisocyanates or branched polyethers or polyesters.

Compositions which include e.g. a polyester of molecular weight 1500 to 3000, one to eight times the molar quantity of water and a quantity of water substantially equivalent to the OH groups generally lead to useful products.

The reactivity of the higher molecular weight compounds that contain at least two terminal OH groups towards isocyantes should not differ too much from the reactivity of the polyol or polyamine which may be used and of water towards isocyanate. The reactivities are preferably approximately equal but the reactivity of the cross-linking agent may also be greater or smaller up to a factor of 5, preferably a factor of 2. This reactivity is the reaction velocity constant in liters per mol per sec. (see J. H. Saunders and K. C. Frisch, "Polyurethanes," part I, New York (1962), pp. 206 and 208).

The solvents suitable for the process according to the invention must dissolve the starting materials at the working up temperature, which can be determined by a preliminary test.

The solvent to be used must have only a slight swelling effect on the finished polyurethane polyurea, so that if, for example, a circular piece of film of the polyurethane polyurea e.g. of 3 cm. in diameter and 0.2 to 0.5 mm. in thickness is placed in the solvent, less than 50% by weight (based on this sample of film) is taken up by swelling after 24 hours. Mixtures of such non-swelling solvents may, of course, also be used. In addition, the mixture may also include solvents which can swell the polyurethane by more than 50%, but such solvents should at the most have only half the evaporation number of the remaining non-swelling solvents so that they will evaporate more rapidly on drying. The evaporation number may be determined according to DIN 53 170.

A measure of the porosity and hence permeability to water vapor of a sheet structure is its bulk density. As is well known, non-porous polyurethane polyureas have densities of about 1.1 to 1.3 g./cm.$^3$. The corresponding porous polyurethane polyureas should have a bulk density of less than 0.8 g./cm.$^3$, i.e. one third of the sheeting should consist of pores and two thirds of solid. This means that at the moment of solidification of the sheeting after which no substantial reduction in volume (shrinkage) of the sheeting occurs, the concentration of the polymer in the reaction mixture should be at most 60 to 80 vols. percent.

The process is generally not carried out under pressure or in closed systems, so after the solution is poured out and before the sheet structure solidifies, considerable quantities of solvent can evaporate. Correspondingly dilute solutions are therefore used in these cases. If the process is carried out in a closed system at the saturation vapor pressure of the solvent, the initial concentration of the reactants may also be higher.

Solutions which have solids contents of less than 10 vols. percent are generally of no technical value.

Solidification of the film, e.g. at reaction temperatures of about 80° C., generally occurs after 5 to 40 minutes, depending on the catalyst and the reactivity of the reactants.

In order to obtain a film which has good microporosity, it is necessary for the reaction mixture to gell soon after it has been poured out. Gelling is a solidification of the reaction mixture without phase separation, i.e. without serum-type separation of the solvent. After gelling, the sheet structure can generally no longer be deformed.

After gelling, increasing solidification occurs due to progressive polyaddition. This solidification can be followed e.g. with a Shore A measuring instrument. If this measuring instrument indicates a Shore hardness A of more than 25, e.g. in a film of 5 mm. thickness, solidification has begun. According to the process, at least 30% by volume of the sheeting should still consist of solvent at that stage. In order to facilitate the escape from the reaction mixture of gas bubbles, which are liberated by the reaction of the isocyanate with water, tensides or emulsifiers may be added to the reaction mixture. The process also permits the inclusion of other polymers, dyes, fillers, stabilizers, cross-linking agents etc. in the form of solutions, organic dispersions or solids, which are advantageously mixed into the starting solutions. One advantage of the process is the generally wide range of application as regards the starting components and solvents which may be used. The products produced by the process may be used as filter materials and as porous coatings for textiles etc.

The process according to the invention is described in more detail below by the following examples. The parts mentioned in the examples are parts by weight unless otherwise indicated.

EXAMPLE 1

About 36.4 parts (40 mmols OH) of a partly branched polyester of adipic acid, diethylene glycol (OH number 60, 1.8% NCO) and 6.3 mols percent (based on diethylene glycol) of trimethylol propane are treated with about 1.3 parts (150 mmols OH) of water and dissolved in a solvent mixture of about 60 parts by volume of xylene, about 30 parts by volume of butyl acetate and about 30 parts by volume THF. About 16 parts (200 mmols NCO) of 1,4-phenylene diisocyanate are dissolved in the mixture at about 50° C., about 5 parts of triethylamine are added and after about 4 seconds stirring the resulting mixture is poured out on glass plates of about 800 cm.$^2$ in area, and polyaddition is completed at about 50° C. with simultaneous evaporation of the solvent. The microporous film produced has a permeability to water vapor of 5.9 mg./h./cm.$^2$.

EXAMPLE 2

About 20 parts (20 mmols OH) of a linear polyester of adipic acid and ethylene glycol (OH number 56, 1.7% OH) and about 0.6 part of water (65 mmols OH) are dissolved in about 100 parts by volume tetrahydrofuran and about 30 parts by volume of cleaning petrol (aliphatic hydrocarbon mixture of boiling range 160 to 196° C.) and heated to about 50° C., and then about 32.3 parts of a commercial 75% solution of the addition product of 2,4-toluylene diisocyanate with trimethylolpropane (13.2% NCO) in ethyl acetate are added. About 0.5 part of diazabicyclooctane was introduced into this solution which was then stirred for about 60 seconds and poured out on a grained metal plate of about 1000 cm.$^2$ in area. After polyaddition has terminated and the solvent has evaporated, at about 50° C., a microporous film which has a permeability to water vapor of 0.5 mg./h./cm.$^2$ is obtained.

EXAMPLE 3

About 40 parts (40 mmols OH) of a linear polyester of adipic acid and ethylene glycol (OH number 56, 1.7% OH) and about 0.6 part by volume of water (66 mmols OH) are dissolved in about 60 parts by volume of ethyl acetate and about 30 parts by volume of methyl cyclohexane. About 14 parts (1.20 mmols of NCO) of 4,4'-diphenylmethane diisocyanate are introduced at about 80° C. About 0.3 part of diazobicyclooctane is added and after about 40 seconds stirring the mixture is poured out on to glass plates of about 1600 cm.$^2$ in area, the polyaddition is completed and the solvent allowed to evaporate at about 80° C. A microporous film which has a permeability to water vapor of 1 mg./h./cm.$^2$ is obtained.

EXAMPLE 4

About 19.3 parts (20 mmols OH) of a linear polybutylene glycol ether (OH number 54) and about 0.6 part (65 mmols OH) of water are dissolved in about 70 parts by volume of nitromethane, and about 12.5 parts (100 mmols NCO) of 4,4'-diphenylmethane diisocyanate are added at about 80° C. After the addition of about 0.2 part of diazabicyclooctane, the reaction mixture is stirred for a further 10 seconds, poured on to backing paper which can afterwards be removed, and dried at about 80° C. to form a microporous film, which after removal of the backing paper has a permeability to water vapor of 4 mg./h./cm.$^2$.

A film produced in an analogous manner in about 90 parts by volume of nitromethane at about 90° C. with about 0.1 part of diazabicyclooctane (stirring time 35 seconds) has a permeability to water vapor of 1.3 mg./h./cm.$^2$.

EXAMPLE 5

About 30 parts (30 mmols OH) of a linear polyester of adipic acid and ethylene glycol (OH number 56, 1.7% OH), about 0.4 part of butane-1,4-diol (10 mmols OH) and about 0.6 part of water (65 mmols OH) are dissolved in about 100 parts by volume of acetonitrile, and about 15.4 parts (110 mmols NCO) of a commercial carbodiimide-containing 4,4' - diphenyl - methane diisocyanate (30.4% NCO) and about 3 parts of dimethylbenzylamine are added at about 70° C. After about 60 seconds stirring, the mixture is poured out on to a glass plate of about 1600 cm.$^2$ in area and heated at about 80° C. to form a microporous film which has a permeability to water vapor of 2.8 mg./h./cm.$^2$.

EXAMPLE 6

About 36.4 parts of a partly branched polyester of adipic acid, diethylene glycol and 6.3 mols percent (based on diethylene glycol) of trimethylolpropane (OH number 60, 1.7% OH) and about 0.9 part of water are dissolved in about 90 parts by volume of butyl acetate and about 100 parts by volume of xylene and heated to about 70° C. After the addition of about 19.3 parts of 4,4'-diphenylmethane diisocyanate and about 0.2 part of diazabicyclooctane, the reaction mixture was stirred for about 35 seconds and poured out on to a glass plate 570 cm.$^2$ in area. The film was dried at about 75° C. and the solidification process with simultaneous evaporation of the solvent was followed.

The dry film had a permeability to water vapor of 0.9 mg./h./cm.$^2$.

| Time (min.) | 0 | 5 | 10 | 15 | 20 | 25 | 30 | 35 | 40 | 45 | 50 | 55 | 60 | 65 | 70 | 75 | 80 | 85 | 90 | 300 |
|---|---|---|---|---|---|---|---|---|---|---|---|---|---|---|---|---|---|---|---|---|
| Weight of film (g.) | 200 | 185 | 176 | 170 | 165 | 155 | 150 | 148 | 140 | 135 | 130 | 125 | 120 | 120 | 110 | 105 | 100 | 90 | 90 | 50 |
| Shore A | | | 6 | 10 | 15 | 20 | 25 | 30 | 32 | 35 | 40 | 42 | 42 | 42 | 44 | 47 | 55 | 58 | 60 | 75 |

Although the invention has been described in considerable detail in the foregoing, it is to be understood that such detail is solely for the purpose of illustration and that

What is claimed is:

1. A process for the production of microporous sheet structures which comprises reacting
   (1) a compound having at least two terminal OH groups and a molecular weight between about 500 and about 10,000,
   (2) a compound having at least two NCO groups and a molecular weight of about 100 to about 10,000, and
   (3) water, the reactants being present in a molar ratio of NCO/OH of 0.8/1 to 2/1 to yield a polyurethane polyurea having a Shore A hardness of at least 50, a tensile strength of at least 50 kg. wt./cm.$^2$ and a softening range above about 100° C., said polyaddition being carried out at a temperature of up to about 150° C., in a 10 to 80 vols. percent solution in a solvent which
   (a) dissolves at least starting materials 1 and 2 at the reaction temperature,
   (b) dissolves the polyurethane urea which is to be formed with increasing difficulty as the degree of polyaddition increases, and finally causes gelling after 20 minutes at the most under the chosen reaction conditions, and
   (c) does not cause substantial swelling of the completely reacted polyurethane polyurea, pouring the reaction mixture on to a support while still pourable to form a sheet structure, completing the polyaddition at a temperature below the softening point of the polyurethane polyurea and removing the solvent.

2. The process of claim 1 wherein the solvent is a mixture of a first solvent and at least one second solvent, said first solvent being absorbed by the polyurethane formed to an extent of at least 50% by weight swelling and having an evaporation number at the most equal to half the evaporation number of the second solvent, said second solvent having a smaller tendency to cause swelling than said first solvent.

3. The process of claim 1 wherein the mixing of the reactants is carried out continuously and that the reaction mixture is applied continuously to porous substrates.

4. The process of claim 1 wherein the reaction mixture also contains a compound having a molecular weight of about 60 to about 600 and at least two OH or NH groups, the reactivity of said compound being between ⅕ and 5 times the reactivity of the NCO groups.

5. The process of claim 1 wherein the mixing of the reactants is carried out continuously and the reaction mixture is applied continuously to a non-porous substrate, the microporous film being removed from said substrate upon completion of the polyaddition reaction and evaporation of the solvent.

References Cited

UNITED STATES PATENTS

| | | | |
|---|---|---|---|
| 3,582,396 | 6/1971 | Konig et al. | 117—135.5 |
| 3,000,757 | 9/1961 | Johnston | 117—135.5 X |
| 3,190,765 | 6/1965 | Yuan | 117—135.5 X |
| 3,281,396 | 10/1966 | Barnes | 264—41 X |
| 3,208,875 | 9/1965 | Holden | 117—135.5 |
| 3,384,506 | 5/1968 | Elkin | 117—135.5 X |
| 3,386,962 | 6/1968 | Damusis | 117—161 X |
| 3,460,969 | 8/1969 | Murphy | 117—135.5 X |

FOREIGN PATENTS

| | | | |
|---|---|---|---|
| 722,614 | 11/1965 | Canada | 117—62.2 |

WILLIAM D. MARTIN, Primary Examiner

W. R. TRENOR, Assistant Examiner

U.S. Cl. X.R.

117—161 KP; 264—41, 48

UNITED STATES PATENT OFFICE
CERTIFICATE OF CORRECTION

Patent No. 3,681,125          Dated  August 1, 1972

Inventor(s)  Harro Traubel and Klaus Konig

It is certified that error appears in the above-identified patent and that said Letters Patent are hereby corrected as shown below:

Column 2, lines 1 and 2 "1/08 to 1/2" should read -- $\frac{0.8}{1}$ to $\frac{2}{1}$ --.

Column 3, line 3 "methcyclohexane" should read --methylcyclohexane--.

Signed and sealed this 13th day of February 1973.

(SEAL)
Attest:

EDWARD M. FLETCHER, JR.
Attesting Officer

ROBERT GOTTSCHALK
Commissioner of Patents